Patented Nov. 28, 1944

2,363,981

UNITED STATES PATENT OFFICE 2,363,981

METHOD OF IMPROVING THE ADHESION OF RUBBER TO FIBROUS MATERIALS AND PRODUCT THEREOF

Edward T. Lessig, Silver Lake, and Edward N. Cunningham, Cuyahoga Falls, Ohio, assignors to The B. F. Goodrich Company, New York, N. Y., a corporation of New York No Drawing. Application July 3, 1941,
Serial No. 400,962

10 Claims. (Cl. 154—2)

This invention relates to the manufacture of composite products comprising rubber and fibrous materials in adhering relation and is particularly concerned with improving the adhesion of rubber to fibrous materials such as cotton, ramie, silk, artificial silks, glass, or the like in the form of cords, fabrics, and similar fibrous structures.

In the present day manufacture of certain rubber goods which are to be subjected to severe service conditions it has been found desirable to incorporate cords, fabrics, and similar fibrous materials with the rubber in order to give added strength to withstand the severe service. Because of the reinforcing action of these fibrous materials the length of useful service of the rubber goods is to a considerable extent dependent upon the degree of adhesion that is obtained between the rubber and the fibers. If the adhesion is slight the rubber will separate from the fiber at the rubber-fiber interface when the composite structure is subjected to loads. This will cause increased heat generation, the propagation of tears and general breakdown of the entire article. It is accordingly the object of this invention to provide a method whereby improvement in adhesion between rubber and fibrous reinforcing elements may be obtained and to provide superior composite products embodying rubber and fibrous reinforcing elements in strongly adhering relation.

We have discovered that adhesion of fibrous materials to rubber may be improved by making a composite product comprising the fibrous materials surrounded by a layer of rubber containing a chemical rubber stiffener to which is adhered the rubber comprising the main portion of the product. These chemical rubber stiffeners are well known in the rubber art and include such aromatic organic amines as benzidine, p-aminophenol, phenylene diamine, 2-naphthylamine, 1-naphthylamine, toluidine, dianisidine, as well as other chemicals known to have a chemical as distinguished from a purely physical stiffening effect on rubber. Because of the use of these chemical stiffeners the rubber surrounding the fibrous material will be appreciably stiffer than the remainder of the rubber in the composite article or, conversely, the main body of rubber will be softer than the rubber contiguous to the fibrous material. This reduces the strain on the rubber-fiber bond and reduces incipient tearing and separation. Adhesion may be improved as much as 75% by using a thin layer of rubber containing a chemical stiffener of rubber. This layer preferably should be considerably thinner than the rest of the rubber in the article and in the usual case this layer will be from about 0.02 inch to about 0.20 inch thick.

In practicing this invention, a fibrous structure, such as a tire cord, is preferably dipped into a cement comprising rubber, a chemical rubber stiffener, and a solvent. Substantially all the solvent is evaporated and the cord is embedded in a vulcanizable rubber composition and the rubber is vulcanized. The rubber cement may also contain vulcanizing materials but this is not necessary as there will normally be sufficient migration of vulcanizing material from the adjacent rubber to effect vulcanization of the thin layer next to the cord. A typical cement useful in this invention is one containing 10% by weight of the cement of milled smoked sheet rubber, 3% by weight of benzidine, and 87% by weight of benzene.

The relative proportions of rubber and solvent used to make the cement depend upon the thickness of rubber desired to be deposited on the cords while the percentage of the chemical stiffener used depends in a general way upon the amount of the rubber used. In general the amount of rubber will range from 4% to 20%, the stiffener from 1% to 12%, and the solvent from 65% to 95%; all percentages being by weight of the cement. Any of the ordinary rubber solvents may be used in making the cement and these include benzene, gasoline, carbon tetrachloride, as well as many others. It is, of course, not necessary that the rubber containing the chemical stiffener be applied to the fibrous structure in the form of a cement as it may be calendered, or otherwise frictioned, on, if desired.

This invention is particularly applicable for treating tire cords prior to their use in tire construction and the like but it is also applicable for making any composite product comprising rubber with fibrous materials as reinforcing elements. Although various specific details and examples of methods of practicing this invention have been presented herein we do not wish to be limited by these but wish rather to claim the invention broadly within the spirit and scope of the appended claims.

We claim:

1. In a method of making a composite product comprising rubber and fibrous material in adhering relationship, the steps comprising coating the fibrous material with rubber containing a chemical rubber stiffener, associating the coated fibrous material with unvulcanized but vulcanizable rubber, and vulcanizing the rubber in the composite structure, whereby improved adhesion between the rubber and fibrous material is obtained.

2. In a method of making a composite product comprising rubber and fibrous material in adhering relationship, the steps comprising coating the fibrous material with a thin layer of rubber containing a chemical rubber stiffener, associating the coated fibrous material with unvulcanized but vulcanizable rubber, and vulcanizing the rubber in the composite structure, whereby improved adhesion between the rubber and fibrous material is obtained.

3. In a method of making a composite product comprising rubber and fibrous material in adhering relationship, the steps comprising coating the fibrous material with a liquid rubber composition containing a chemical rubber stiffener, associating the coated fibrous material with unvulcanized but vulcanizable rubber, and vulcanizing the rubber in the composite structure, whereby improved adhesion between the rubber and fibrous material is obtained.

4. In a method of making a composite product comprising rubber and fibrous material in adhering relationship, the steps comprising coating the fibrous material with a cement comprising rubber, a chemical rubber stiffener, and a solvent, evaporating substantially all the solvent, associating the coated fibrous material with unvulcanized but vulcanizable rubber, and vulcanizing the rubber in the composite structure, whereby improved adhesion between the rubber and fibrous material is obtained.

5. In a method of making a composite product comprising rubber and cotton cord in adhering relationship, the steps comprising coating the cotton cord with a liquid rubber composition containing a chemical rubber stiffener, associating the coated cotton cord with unvulcanized but vulcanizable rubber, and vulcanizing the rubber in the composite structure, whereby improved adhesion between the rubber and cotton cord is obtained.

6. A composite product comprising fibrous material, a layer of rubber containing a chemical rubber stiffener contiguous to the fibrous material, and a layer of softer rubber surrounding the stiffened rubber.

7. A composite product comprising fibrous material, a layer of rubber containing a chemical rubber stiffener surrounding the fibrous material, and a layer of softer rubber surrounding the stiffened rubber.

8. A composite product comprising cotton cords, a layer of rubber containing a chemical rubber stiffener contiguous to the cotton cords, and a layer of softer rubber surrounding the stiffened rubber.

9. A method as defined by claim 1 in which the chemical rubber stiffener is benzidine.

10. A product as defined by claim 6 in which the chemical rubber stiffener is benzidine.

EDWARD T. LESSIG.
EDWARD N. CUNNINGHAM.